(12) United States Patent
Wilder et al.

(10) Patent No.: US 9,661,117 B2
(45) Date of Patent: May 23, 2017

(54) WEARABLE DEVICES FOR HEADSET STATUS AND CONTROL

(71) Applicant: Plantronics, Inc., Santa Cruz, CA (US)

(72) Inventors: Beau Wilder, Santa Cruz, CA (US); Benjamin Alfred Gesing, Santa Cruz, CA (US); Brent Thorington, Santa Cruz, CA (US)

(73) Assignee: Plantronics, Inc., Santa Cruz, CA (US)

( * ) Notice: Subject to any disclaimer, the term of this patent is extended or adjusted under 35 U.S.C. 154(b) by 0 days.

(21) Appl. No.: 14/801,571

(22) Filed: Jul. 16, 2015

(65) Prior Publication Data

US 2017/0019517 A1    Jan. 19, 2017

(51) Int. Cl.
| | | |
|---|---|---|
| *H04B 7/14* | (2006.01) | |
| *H04W 4/00* | (2009.01) | |
| *H04M 1/60* | (2006.01) | |
| *H04M 1/725* | (2006.01) | |

(52) U.S. Cl.
CPC ....... *H04M 1/7253* (2013.01); *H04M 1/6066* (2013.01)

(58) Field of Classification Search
CPC ............. H04M 1/7253; H04M 1/6066; H04M 1/6058; H04B 7/14; H04B 5/0031; H04W 4/008
See application file for complete search history.

(56) References Cited

U.S. PATENT DOCUMENTS

| | | | | |
|---|---|---|---|---|
| 2002/0068600 A1* | 6/2002 | Chihara | ................. | H04B 1/385 455/557 |
| 2007/0291955 A1* | 12/2007 | Yamashita | ............... | H04R 5/00 381/79 |
| 2008/0146290 A1* | 6/2008 | Sreeram | .............. | H04M 1/6066 455/569.1 |
| 2009/0197533 A1* | 8/2009 | Luk | ..................... | H04M 1/6066 455/41.3 |
| 2009/0216534 A1* | 8/2009 | Somasundaram | .... | G06F 19/322 704/251 |
| 2010/0267376 A1* | 10/2010 | Saari | ........................ | G06F 8/38 455/418 |
| 2013/0012133 A1* | 1/2013 | Liu | ....................... | H04B 5/0031 455/41.3 |
| 2013/0120106 A1* | 5/2013 | Cauwels | ................. | G06F 1/163 340/3.1 |
| 2013/0150133 A1* | 6/2013 | Alameh | .............. | H04M 1/6008 455/569.1 |

(Continued)

*Primary Examiner* — Andrew Wendell

(57) ABSTRACT

One embodiment features a wearable device having computer-readable media and comprising: an output device; a receiver configured to communicate over a wireless link with a phone; and a processor configured to cause the output device to indicate a status of a headset, the headset being in wireless communication with the phone, responsive to the receiver receiving, over the wireless link, an indication of the status of the headset. Another embodiment features a wearable device having associated computer-readable media and comprising: an output device; a receiver configured to communicate over a wireless link with a headset; and a processor configured to cause the output device to indicate a status of a headset responsive to the receiver receiving, over the wireless link, an indication of the status of the headset.

18 Claims, 12 Drawing Sheets

(56) References Cited

U.S. PATENT DOCUMENTS

2015/0350766 A1* 12/2015 Schobel ............... H04R 1/1091
381/77
2016/0066277 A1* 3/2016 Yang ................... H04M 1/6066
455/414.1

* cited by examiner

WEARABLE DEVICES FOR HEADSET STATUS AND CONTROL

FIELD

The present disclosure relates generally to the field of call status and control. More particularly, the present disclosure relates to headset call status and control.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

To meet the demands of conducting business professionally in a mobile environment, mobile professionals seek out premium headsets with sophisticated functions such as microphone mute, volume, answer/end call, and even voice commands to help manage the quality of their communications. User interfaces to control these functions typically require physical buttons or a list of voice commands that the wearer can speak, usually stored in the firmware of the headset.

The lack of a visual user interface for these functions while wearing the headset causes anxiety to the user. Users become uncertain of the microphone mute status of the call, or miss critical information when on a call in loud environments, because they can't find the buttons to change call volume in the headset.

Previous solutions fall into two categories of call control interfaces. With a physical headset user interface, buttons on the headset itself control the microphone mute status of a call, volume of the call, redial, call answer/end ability, and the like. With a PC/Mobile graphical user interface, voice controls stored in the headset firmware allow hands-free voice control including but not limited to pairing the device, answering/ending a call, recognizing and calling a stored contact by name, querying what other voice commands are available with "what can I say?" and the like. Selectable icons to control the call status (microphone mute, volume, answer/end) are typically found in the user interface of softphone clients or in the telephony client of a mobile device/PC.

SUMMARY

In general, in one aspect, an embodiment features a wearable device comprising: an output device; a receiver configured to communicate over a wireless link with a phone; and a processor configured to cause the output device to indicate a status of a headset, the headset being in wireless communication with the phone, responsive to the receiver receiving, over the wireless link, an indication of the status of the headset.

Embodiments of the wearable device may include one or more of the following features. In some embodiments, the status of the headset includes at least one of: a microphone mute status; a volume level; a power level of the headset; a notification of maximum volume; a notification of minimum volume; a notification of call start; and a notification of call end. Some embodiments comprise a transmitter; and a processor configured to cause the transmitter to transmit a control signal over the wireless link responsive to user operation of the wearable device. In some embodiments, the control signal includes at least one of: a microphone mute on control signal; a microphone mute off control signal; a volume up control signal; a volume down control signal; a call start control signal; a call answer control signal; a call redial control signal; and a call end control signal. In some embodiments, the wearable device includes at least one of: a wristwatch; a wristband; a ring; a necklace; and a garment. In some embodiments, the phone includes at least one of: a smartphone; a feature phone; a soft phone; and a desk phone.

In general, in one aspect, an embodiment features computer-readable media embodying instructions executable by a computer in a wearable device to perform functions comprising: receiving, from a phone, over a wireless link with the phone, an indication of a status of a headset; and causing an output device of the wearable device to indicate the status of the headset responsive to receiving the indication of the status of the headset.

Embodiments of the computer-readable media may include one or more of the following features. In some embodiments, the status of the headset includes at least one of: a microphone mute status; a volume level; a power level of the headset; a notification of maximum volume; a notification of minimum volume; a notification of call start; and a notification of call end. In some embodiments, the functions further comprise: causing a transmitter of the wearable device to transmit a control signal over the wireless link responsive to user operation of the wearable device. In some embodiments, the control signal includes at least one of: a microphone mute on control signal; a microphone mute off control signal; a volume up control signal; a volume down control signal; a call start control signal; a call answer control signal; a call redial control signal; a call end control signal. In some embodiments, the wearable device includes at least one of: a wristwatch; a wristband; a ring; a necklace; and a garment. In some embodiments, the phone includes at least one of: a smartphone; a feature phone; a soft phone; and a desk phone.

In general, in one aspect, an embodiment features a wearable device comprising: an output device; a receiver configured to communicate over a wireless link with a headset; and a processor configured to cause the output device to indicate a status of a headset responsive to the receiver receiving, over the wireless link, an indication of the status of the headset.

Embodiments of the wearable device may include one or more of the following features. In some embodiments, the status of the headset includes at least one of: a microphone mute status; a volume level; a power level of the headset; a notification of maximum volume; a notification of minimum volume; a notification of call start; and a notification of call end. Some embodiments comprise a transmitter; and a processor configured to cause the transmitter to transmit a control signal over the wireless link responsive to user operation of the wearable device. In some embodiments, the control signal includes at least one of: a microphone mute on control signal; a microphone mute off control signal; a volume up control signal; a volume down control signal; a call start control signal; a call answer control signal; a call redial control signal; and a call end control signal. In some embodiments, the wearable device includes at least one of: a wristwatch; a wristband; a ring; a necklace; and a garment.

In general, in one aspect, an embodiment features computer-readable media embodying instructions executable by a computer in a wearable device to perform functions comprising: receiving, from a headset, over a wireless link with the headset, an indication of a status of the headset; and causing an output device of the wearable device to indicate the status of the headset responsive to receiving the indication of the status of the headset.

Embodiments of the computer-readable media may include one or more of the following features. In some embodiments, the status of the headset includes at least one of: a microphone mute status; a volume level; a power level of the headset; a notification of maximum volume; a notification of minimum volume; a notification of call start; and a notification of call end. In some embodiments, the functions further comprise: causing a transmitter of the wearable device to transmit a control signal over the wireless link responsive to user operation of the wearable device. In some embodiments, the control signal includes at least one of: a microphone mute on control signal; a microphone mute off control signal; a volume up control signal; a volume down control signal; a call start control signal; a call answer control signal; a call redial control signal; a call end control signal. In some embodiments, the wearable device includes at least one of: a wristwatch; a wristband; a ring; a necklace; and a garment.

The details of one or more implementations are set forth in the accompanying drawings and the description below. Other features will be apparent from the description and drawings, and from the claims.

Figure 1:
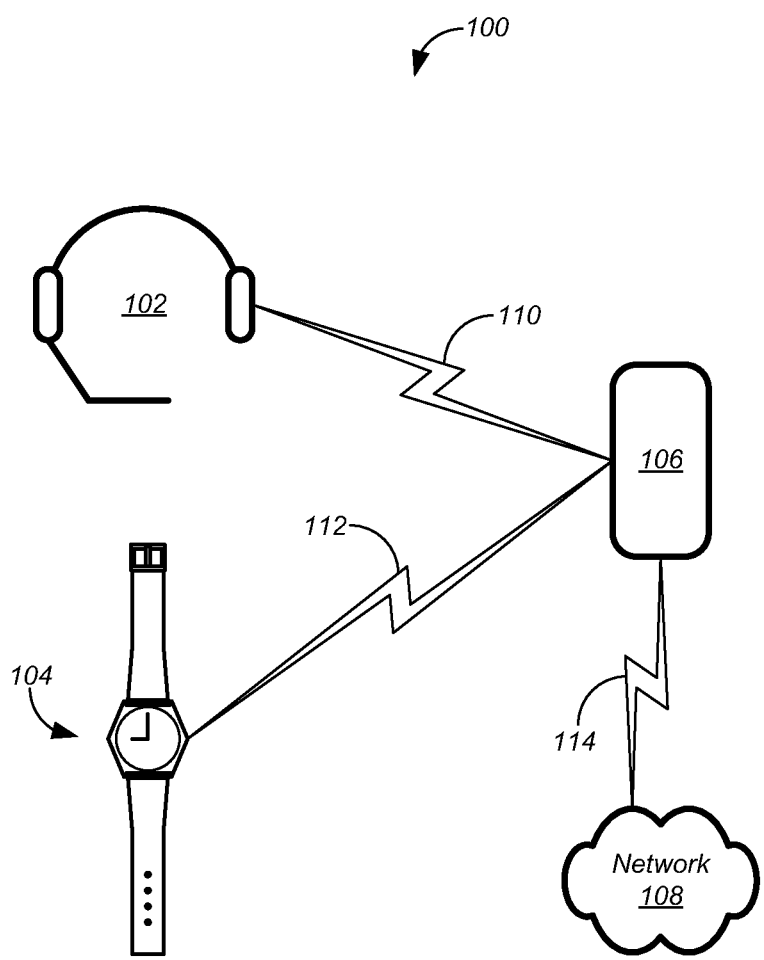
FIG. 1 shows elements of a headset system according to an embodiment that includes a smartphone.

The leading digit(s) of each reference numeral used in this specification indicates the number of the drawing in which the reference numeral first appears.

DETAILED DESCRIPTION

Embodiments of the present disclosure provide wearable devices for headset status and control. In the described embodiments the wearable devices are smartwatches, that is, wristwatches that include processors, output devices such as displays, speakers, and haptic devices, user-operable controls, and wireless transceivers. However the techniques described herein are applicable to other wearable devices as well. For example the wearable devices can include wristbands, rings, necklaces, garments, and the like.

Such a wrist-worn call control center for headset functions provides users with the trust they need during important mobile conversations. The smartwatch and headset may be synchronized at all times. In other words, if the user mutes the headset microphone from the headset the smart watch gives a visual representation that the user is on microphone mute. Then if the user unmutes the headset microphone from the smart watch, the headset microphone comes off mute. The smartwatch then acts not just as a command/control vehicle for the headset functions but also an in-line-of-sight visual representation of the call state.

End users now have a visual user interface for functions that previously were difficult to find and use but still did not give users reassurance that the selected function was being effectively carried out. This solution eliminates the anxiety users feel on important calls by providing visual reassurance of the call state.

Other features are contemplated as well.

FIG. 1 shows elements of a headset system 100 according to an embodiment that includes a smartphone. Although in the described embodiment elements of the headset system 100 are presented in one arrangement, other embodiments may feature other arrangements. For example, elements of the headset system 100 may be implemented in hardware, software, or combinations thereof.

Referring to FIG. 1, the headset system 100 includes a headset 102, a smartwatch 104, a smartphone 106, and a network 108. In other embodiments, the smartphone 106 may be replaced by a feature phone, a desk phone, a soft phone, a computer, and the like. The network 108 may be a mobile network, a computer network or the like. The headset 102 and the smartphone 106 may communicate over a wireless link 110. The smartwatch 104 and the smartphone 106 may communicate over a wireless link 112. The smartphone 106 and the network 108 may communicate over a wireless link 114. As used herein, wireless refers to a communications, monitoring, or control system in which electromagnetic or acoustic waves carry a signal through atmospheric space rather than along a wire.

The wireless links 110, 112, 114 may be Bluetooth links, Digital Enhanced Cordless Telecommunications (DECT) links, cellular links, Wi-Fi links, or the like. The headset 102 may exchange audio, status messages, command messages, and the like with the smartphone 106 over the wireless link 110. The smartwatch 104 may exchange status messages, command messages, and the like with the smartphone 106 over the wireless link 110. The smartphone 106 may exchange audio, status messages, and command messages with the network 108 over the wireless link 114.

Figure 2:
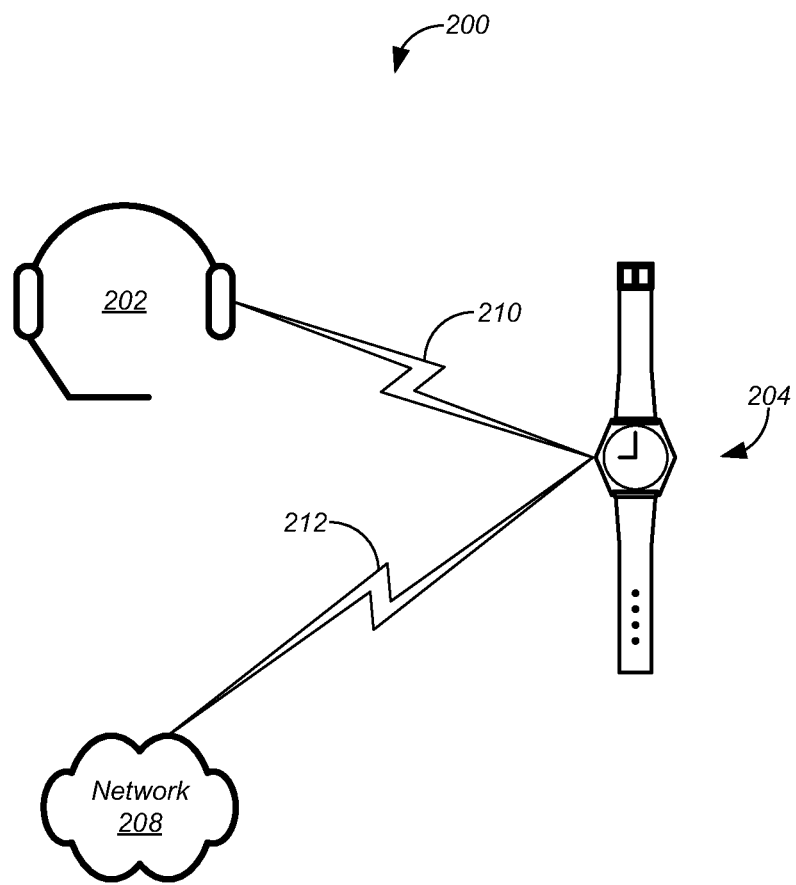
FIG. 2 shows elements of a headset system according to an embodiment that does not include a smartphone.

FIG. 2 shows elements of a headset system 200 according to an embodiment that does not include a smartphone. Although in the described embodiment elements of the headset system 200 are presented in one arrangement, other embodiments may feature other arrangements. For example, elements of the headset system 200 may be implemented in hardware, software, or combinations thereof.

Referring to FIG. 2, the headset system 200 includes a headset 202, a smartwatch 204, and a network 208. The network 208 may be a mobile network, a computer network or the like. The headset 102 and the smartwatch 204 may communicate over a wireless link 210. The smartwatch 204 and the network 208 may communicate over a wireless link 212. In this embodiment, the smartwatch 204 is capable of phone calls, and so no smartphone is needed.

The wireless links 210, 212 may be Bluetooth links, Digital Enhanced Cordless Telecommunications (DECT) links, cellular links, Wi-Fi links, or the like. The headset 102 may exchange audio, status messages, command messages, and the like with the smartwatch 204 over the wireless link 210. The smartwatch 204 may exchange audio, status messages, command messages, and the like with the network 208 over the wireless link 212.

Figure 3:
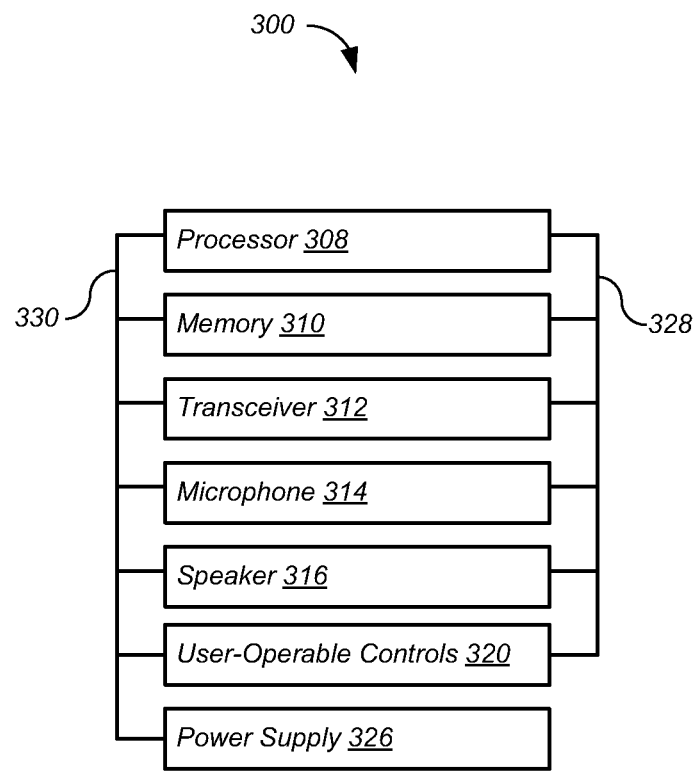
FIG. 3 shows elements of a headset according to one embodiment.

FIG. 3 shows elements of a headset 300 according to one embodiment. The headset 300 may be used as the headset 102 of FIG. 1 or as the headset 202 of FIG. 2. Although in the described embodiment elements of the headset 300 are presented in one arrangement, other embodiments may feature other arrangements. For example, elements of the headset 300 may be implemented in hardware, software, or combinations thereof.

Referring to FIG. 3, the headset 300 may include one or more of a transceiver 312, a processor 308, a memory 310, a microphone 314, a speaker 316, one or more user-operable controls 320, and a power supply 326. The headset 300 may include other elements as well. The elements of headset 300 may receive power from the power supply 326 over one or more power rails 330. Various elements of the headset 300 may be implemented as one or more integrated circuits.

The processor 308 may execute applications stored in the memory 310. The processor 308 may include digital signal processors, analog-to-digital converters, digital-to-analog converters, and the like. The processor 308 may communicate with other elements of the headset 300 over one or more communication busses 328. The transceiver 312 may employ any communication protocol, including wired and wireless communication protocols. The wireless protocols may include Bluetooth, Bluetooth Low-Energy (BLE), Wi-Fi, Digital Enhanced Cordless Telecommunications (DECT), cellular, near-field communications (NFC), and the like. The transceiver 312 may employ multiple communication protocols. The user-operable controls 320 may include buttons, slide switches, capacitive sensors, touch screens, and the like.

Figure 4:
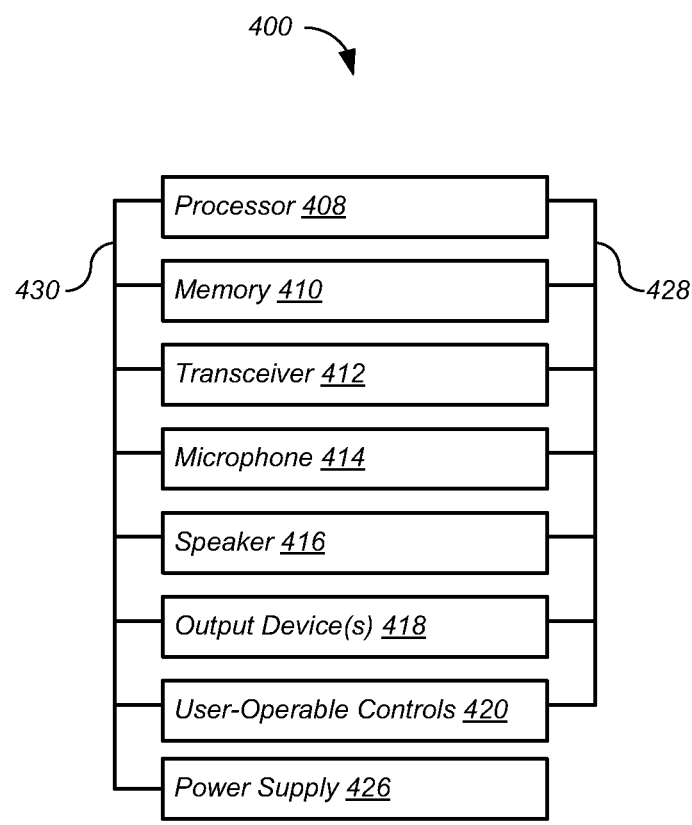
FIG. 4 shows elements of a smartwatch according to one embodiment.

FIG. 4 shows elements of a smartwatch 400 according to one embodiment. The smartwatch 400 may be used as the smartwatch 104 of FIG. 1 or as the smartwatch 204 of FIG. 2. Although in the described embodiment elements of the smartwatch 400 are presented in one arrangement, other embodiments may feature other arrangements. For example, elements of the smartwatch 400 may be implemented in hardware, software, or combinations thereof.

Referring to FIG. 4, the smartwatch 400 may include one or more of a transceiver 412, a processor 408, a memory 410, a microphone 414, a speaker 416, one or more output devices 418, one or more user-operable controls 420, and a power supply 426. The elements of smartwatch 400 may receive power from the power supply 426 over one or more power rails 430. Various elements of the smartwatch 400 may be implemented as one or more integrated circuits. The smartwatch 400 may include other elements as well.

The processor 408 may execute applications stored in the memory 410. The processor 408 may communicate with other elements of the smartwatch 400 over one or more communication busses 428. The elements of smartwatch 400 may receive power from the power supply 426 over one or more power rails 430. Various elements of the smartwatch 400 may be implemented as one or more integrated circuits.

The transceiver 412 may employ any communication protocol, including wired and wireless communication protocols. The wireless protocols may include Bluetooth, Bluetooth Low-Energy (BLE), Wi-Fi, Digital Enhanced Cordless Telecommunications (DECT), cellular, near-field communications (NFC), and the like. The transceiver 412 may employ multiple communication protocols. The processor 408 may include digital signal processors, analog-to-digital converters, digital-to-analog converters, and the like. The output devices 418 may include displays, speakers, haptic devices, and the like. The displays may be implemented as a touch screen or the like. The user-operable controls 420 may include buttons, slide switches, capacitive sensors, touch screens, and the like.

Figure 5:
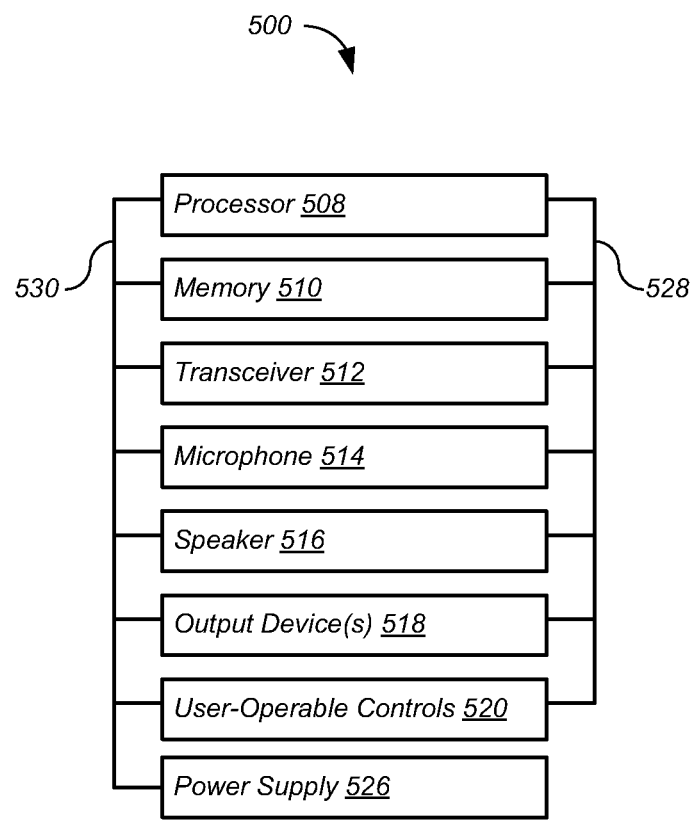
FIG. 5 shows elements of a smartphone according to one embodiment.

FIG. 5 shows elements of a smartphone 500 according to one embodiment. The smartphone 500 may be used as the smartphone 106 of FIG. 1. Although in the described embodiment elements of the smartphone 500 are presented in one arrangement, other embodiments may feature other arrangements. For example, elements of the smartphone 500 may be implemented in hardware, software, or combinations thereof.

Referring to FIG. 5, the smartphone 500 may include one or more of a transceiver 512, a processor 508, a memory 510, a microphone 514, a speaker 516, one or more output devices 518, one or more user-operable controls 520, and a power supply 526. The elements of smartphone 500 may receive power from the power supply 526 over one or more power rails 530. Various elements of the smartphone 500 may be implemented as one or more integrated circuits. The smartphone 500 may include other elements as well.

The processor 508 may execute applications stored in the memory 510. The processor 508 may communicate with other elements of the smartphone 500 over one or more communication busses 528. The elements of smartphone 500 may receive power from the power supply 526 over one or more power rails 530. Various elements of the smartphone 500 may be implemented as one or more integrated circuits.

The transceiver 512 may employ any communication protocol, including wired and wireless communication protocols. The wireless protocols may include Bluetooth, Bluetooth Low-Energy (BLE), Wi-Fi, Digital Enhanced Cordless Telecommunications (DECT), cellular, near-field communications (NFC), and the like. The transceiver 512 may employ multiple communication protocols. The processor 508 may include digital signal processors, analog-to-digital converters, digital-to-analog converters, and the like.

The output devices 518 may include displays, speakers, haptic devices, and the like. The displays may be implemented as touch screens or the like. The user-operable controls 520 may include buttons, slide switches, capacitive sensors, touch screens, and the like.

Figure 6:
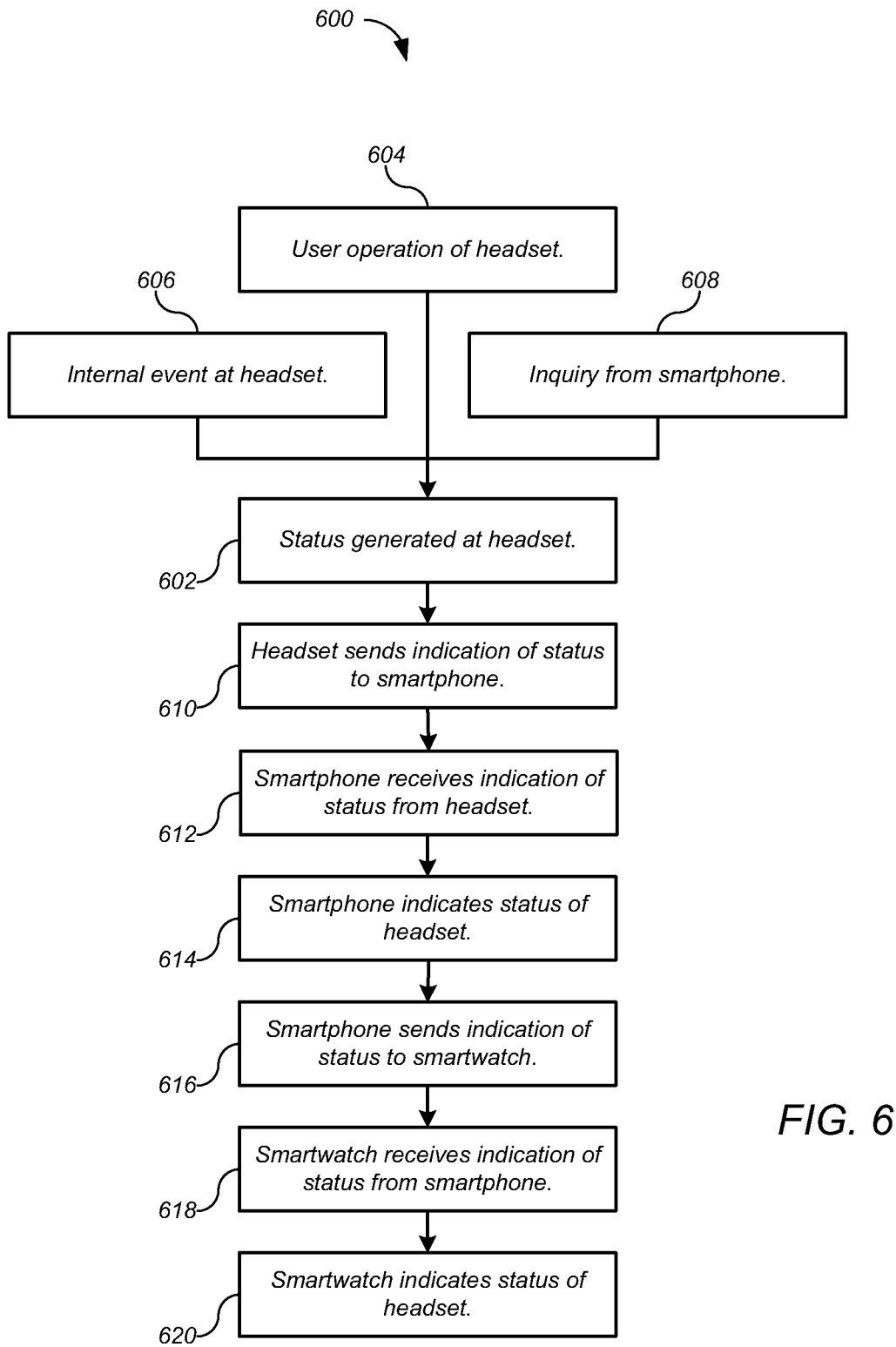
FIG. 6 shows a status reporting process for the headset system of FIG. 1 according to one embodiment.

FIG. 6 shows a status reporting process 600 for the headset system 100 of FIG. 1 according to one embodiment. Although in the described embodiments the elements of process 600 are presented in one arrangement, other embodiments may feature other arrangements. For example, in various embodiments, some or all of the elements of process 600 can be executed in a different order, concurrently, and the like. Also some elements of process 600 may not be performed, and may not be executed immediately after each other. In addition, some or all of the elements of process 600 can be performed automatically, that is, without human intervention.

Referring to FIG. 6, at 602, a status may be generated at the headset 102. As used herein the term "status" may include a status change, notification of a status, and the like. At 604, the status change or notification of status may be generated responsive to user operation of the headset 102.

For example, the user may operate the user-operable controls 320 of the headset 102. Responsive to the operation of volume controls, the volume may change, and if a maximum or minimum volume is reached, the headset 102 may generate a notification of maximum or minimum volume, which may be announced for the user over the speaker 316 of the headset 102. Responsive to the operation of a microphone mute control, audio generated by the microphone 314 may be blocked from transmission from the headset 102 by the transceiver 312, and the headset 102 may generate a notification of microphone mute on or microphone mute off, which may be announced for the user over the speaker 316 of the headset 102. Responsive to the operation of a call control, the headset 102 may start a call or end a call.

At 606, the status may be generated responsive to an internal event at the headset 102. for example, the processor 308 may determine that the power level of the power supply 326 has dropped below a threshold, and may therefore announce this status change for the user over the speaker 316 of the headset.

At 608, the status may be generated responsive to an inquiry from the smartphone 106. For example, the smartphone 106 may send a message over the wireless link 110 that requests the power level of the power supply 326 of the headset 102.

At 610, responsive to generation of the status, the headset 102 may send an indication of the status to the smartphone 106. That is, the transceiver 312 of the headset 102 may transmit a message over the wireless link 110, where the message represents the indication of the status. At 612, the smartphone 106 may receive the indication of the status. That is, the transceiver 512 of the smartphone 106 may receive the message transmitted by the headset 102 over the wireless link 110.

Figure 11:
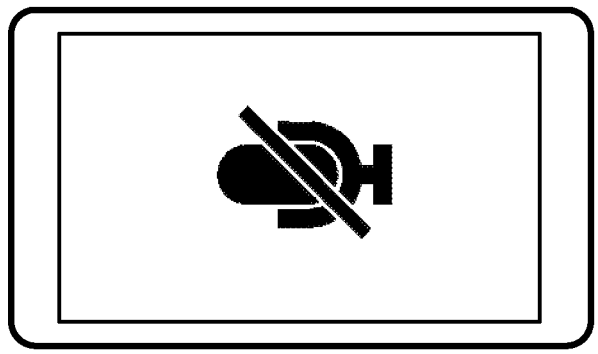
FIG. 11 shows a smartphone display showing an icon that indicates the headset microphone is muted.
Figure 10:
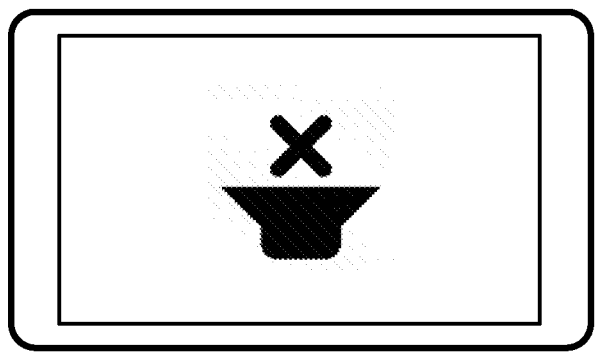
FIG. 10 shows a smartphone display showing an icon that indicates the headset volume is at minimum volume (no sound).

At 614, responsive to receiving the indication of the status from the headset 102, the smartphone 106 may indicate the status of the headset 102. That is, the processor 508 of the smartphone 106 may cause an output device 518 of the smartphone 106 to generate an output representing the status. For example, the status may include a microphone mute status, a volume level, a power level of the headset 102, a notification of maximum volume, a notification of minimum volume, a notification of call start, a notification of call end, and the like. For example, a display of the smartphone 106 may show a message announcing "Call End" or the like. As another example, a haptic device of the smartphone 106 may vibrate to indicate the headset 102 has reached maximum volume. FIG. 10 shows a smartphone display showing an icon that indicates the headset volume is at minimum volume (no sound). FIG. 11 shows a smartphone display showing an icon that indicates the headset microphone 314 is muted.

At 616, responsive to receiving the indication of the status from the headset 102, the smartphone 106 may send an indication of the status to the smartwatch 104. That is, the transceiver 512 of the smartphone 106 may transmit a message over the wireless link 112, where the message represents the indication of the status.

At 618, the smartwatch 104 may receive the indication of the status. That is, the transceiver 412 of the smartwatch 104 may receive the message transmitted by the smartphone 106 over the wireless link 112.

Figure 12:
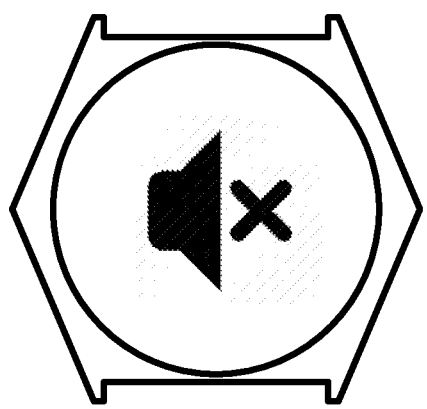
FIG. 12 shows a watch display showing an icon that indicates the headset volume is at minimum volume (no sound).
Figure 13:
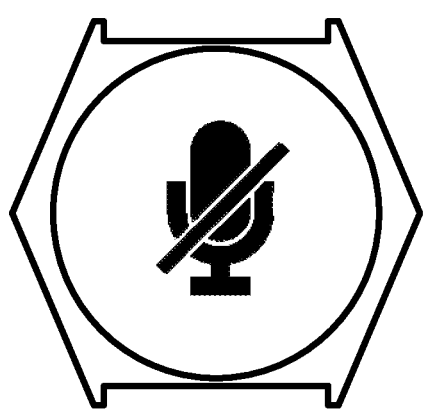
FIG. 13 shows a watch display showing an icon that indicates the headset microphone is muted.

At 620, responsive to receiving the indication of the status from the smartphone 106, the smartwatch 104 may indicate the status of the headset 102. That is, the processor 408 of the smartwatch 104 may cause an output device 418 of the smartwatch 104 to generate an output representing the status. For example, the status may include a microphone mute status, a volume level, a power level of the headset, a notification of maximum volume, a notification of minimum volume, a notification of call start, a notification of call end, and the like. For example, a display of the smartwatch 104 may show a message announcing "Call End" or the like. As another example, a haptic device may vibrate to indicate the headset 102 has reached maximum volume. FIG. 12 shows a watch display showing an icon that indicates the headset volume is at minimum volume (no sound). FIG. 13 shows a watch display showing an icon that indicates the headset microphone 314 is muted.

Figure 7A:
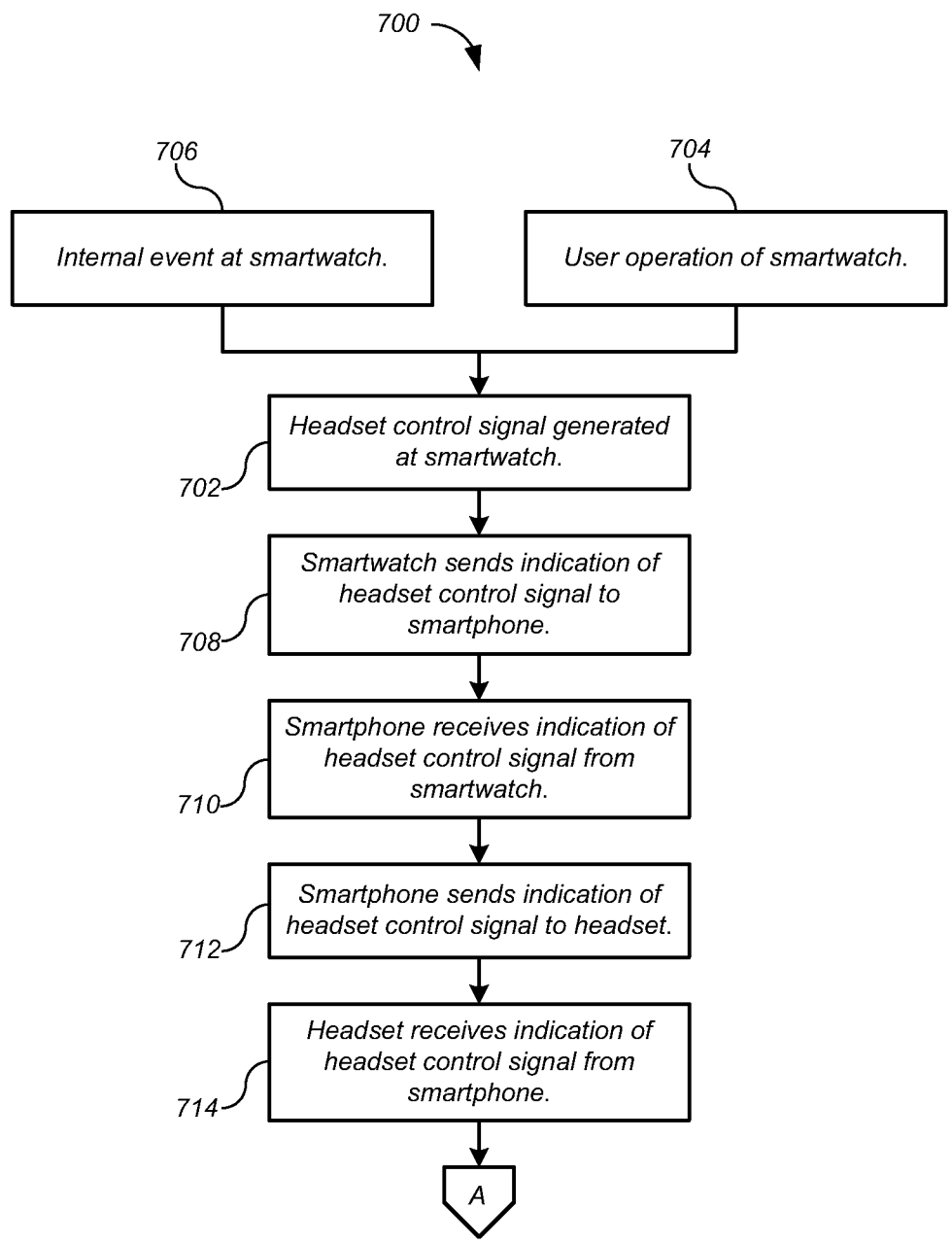
FIGS. 7A and 7B shows a headset control process for the headset system of FIG. 1 according to one embodiment.
Figure 7B:
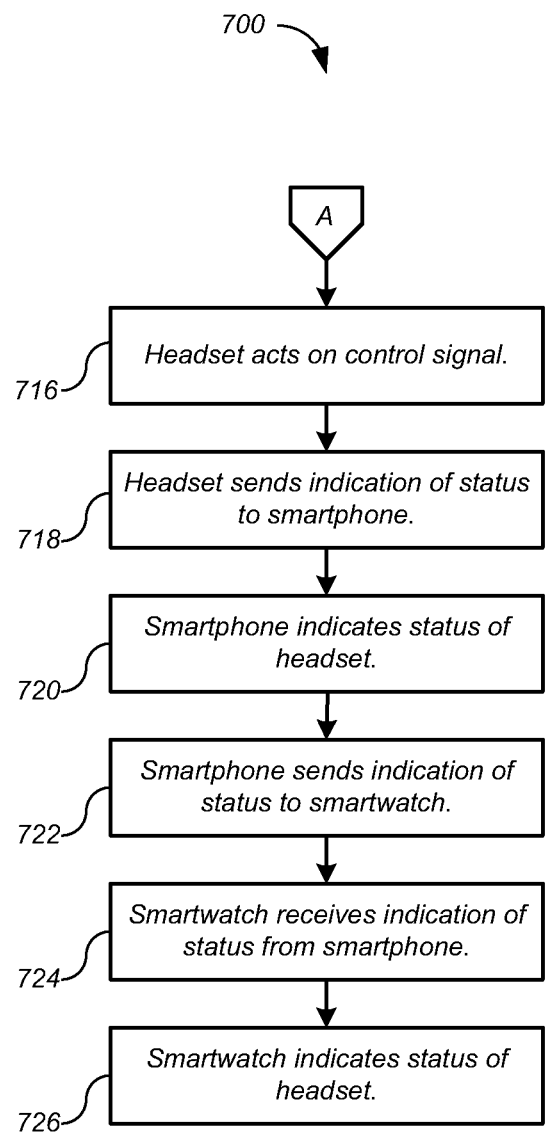

FIGS. 7A and 7B shows a headset control process 700 for the headset system 100 of FIG. 1 according to one embodiment. Although in the described embodiments the elements of process 700 are presented in one arrangement, other embodiments may feature other arrangements. For example, in various embodiments, some or all of the elements of process 700 can be executed in a different order, concurrently, and the like. Also some elements of process 700 may not be performed, and may not be executed immediately after each other. In addition, some or all of the elements of process 700 can be performed automatically, that is, without human intervention.

Referring to FIG. 7, at 702, a headset control signal may be generated at the smartwatch 104. The headset control signals may include a microphone mute on control signal, a microphone mute off control signal, a volume up control signal, a volume down control signal, a call start control signal, a call answer control signal, a call redial control signal, a call end control signal, and the like.

At 704, the headset control signal may be generated responsive to user operation of the smartwatch 104. For example, the user may operate controls 420 of the smartwatch 104 for volume up, volume down, call start, call answer, call redial, call end, and the like.

At 706, the headset control signal may be generated responsive to an internal event at the smartwatch 104. For example, the processor 408 may determine that a call has been ended by another party to the call.

At 708, responsive to generation of the headset control signal, the smartwatch 104 may send an indication of the headset control signal to the smartphone 106. That is, the transceiver 412 of the smartwatch 104 may transmit a message over the wireless link 112, where the message represents the headset control signal.

At 710, the smartphone 106 may receive the indication of the headset control signal. That is, the transceiver 512 of the smartphone 106 may receive the message transmitted by the smartwatch 104 over the wireless link 112.

At 712, responsive to receiving the indication of the headset control signal from the smartwatch 104, the smartphone 106 may send an indication of the headset control signal to the headset 102. That is, the transceiver 512 of the smartphone 106 may transmit a message over the wireless link 110, where the message represents the indication of the headset control signal.

At 714, the headset 102 may receive the indication of the headset control signal. That is, the transceiver 312 of the headset 102 may receive the message transmitted by the smartphone 106 over the wireless link 110.

At 716, responsive to receiving the indication of the headset control signal from the smartphone 106, the headset 102 may act on the headset control signal. That is, the processor 308 of the headset 102 may perform the action indicated by the headset control signal. For example, the processor 308 may mute or un-mute the microphone 314 of the headset 102, change the volume level of the headset 102, start, answer, or end a call, redial a number, determine and report a power level of the headset 102, or the like.

Acting on the headset control signal may result in a change of status at the headset 102. At 718, responsive to the status change, the headset 102 may send an indication of the new status to the smartphone 106. That is, the transceiver 312 of the headset 102 may transmit a message over the wireless link 110, where the message represents the indication of the new status.

At 720, responsive to receiving the indication of the status from the headset 102, the smartphone 106 may indicate the status of the headset 102. That is, the processor 508 of the smartphone 106 may cause an output device 518 of the smartphone 106 to generate an output representing the status. For example, the status may include a microphone mute status, a volume level, a power level of the headset 102, a notification of maximum volume, a notification of minimum volume, a notification of call start, a notification of call end, and the like. For example, a display of the smartphone 106 may show a message announcing "Call End" or the like. As another example, a haptic device of the smartphone 106 may vibrate to indicate the headset 102 has reached maximum volume. FIG. 10 shows a smartphone display showing an icon that indicates the headset volume is at minimum volume (no sound). FIG. 11 shows a smartphone display showing an icon that indicates the headset microphone 314 is muted. At 722, responsive to receiving the indication of the status from the headset 102, the smartphone 106 may send an indication of the status to the smartwatch 104. That is, the transceiver 512 of the smartphone 106 may transmit a message over the wireless link 112, where the message represents the indication of the status.

At 724, the smartwatch 104 may receive the indication of the status. That is, the transceiver 412 of the smartwatch 104 may receive the message transmitted by the smartphone 106 over the wireless link 112.

At 726, responsive to receiving the indication of the status from the smartphone 106, the smartwatch 104 may indicate the status of the headset 102. That is, the processor 408 of the smartwatch 104 may cause an output device 418 of the smartwatch 104 to generate an output representing the status. For example, the status may include a microphone mute status, a volume level, a power level of the headset 102, a notification of maximum volume, a notification of minimum volume, a notification of call start, a notification of call end, and the like. For example, a display of the smartwatch 104 may show a message announcing "Call End" or the like. As another example, a haptic device may vibrate to indicate the headset 102 has reached maximum volume. FIG. 12 shows a watch display showing an icon that indicates the headset volume is at minimum volume (no sound). FIG. 13 shows a watch display showing an icon that indicates the headset microphone 314 is muted.

Figure 8:
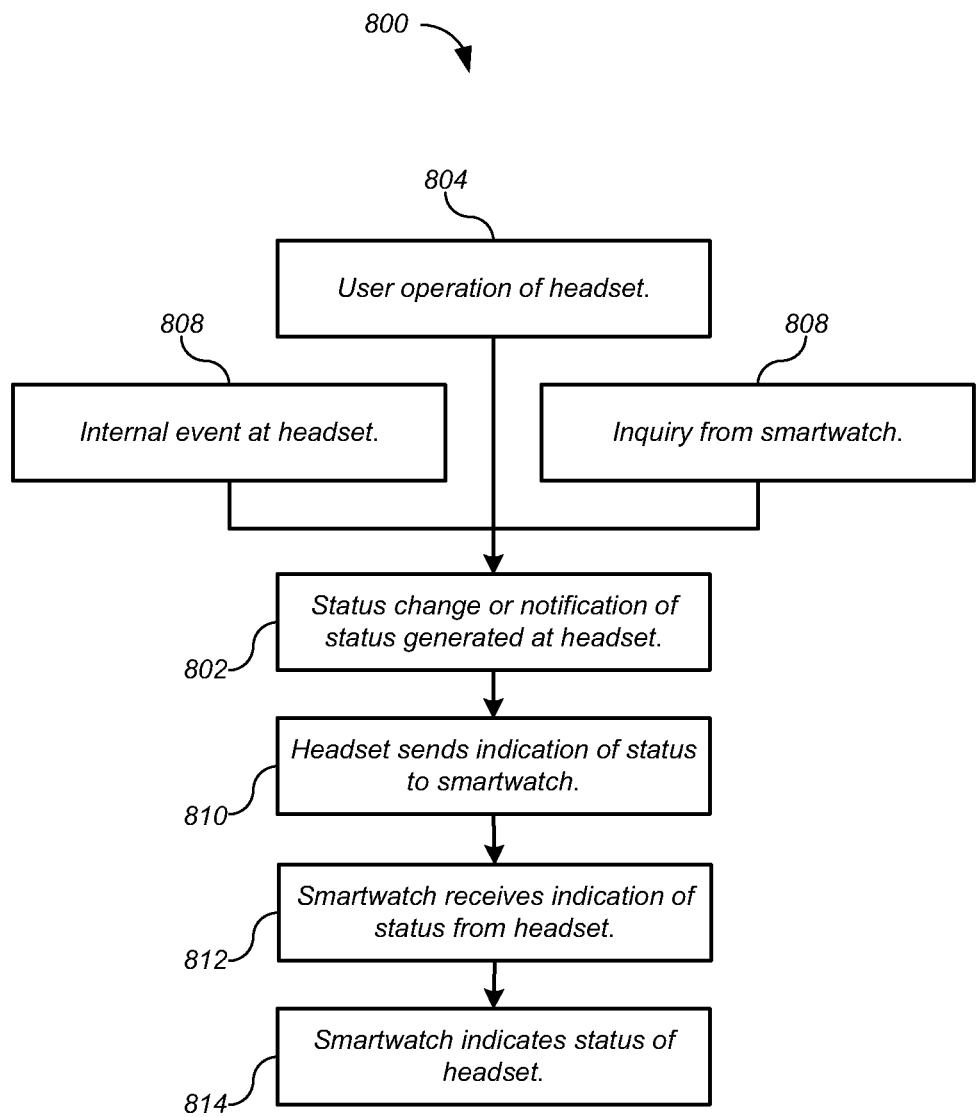
FIG. 8 shows a status reporting process for the headset system of FIG. 2 according to one embodiment.

FIG. 8 shows a status reporting process 800 for the headset system 200 of FIG. 2 according to one embodiment. Although in the described embodiments the elements of process 800 are presented in one arrangement, other embodiments may feature other arrangements. For example, in various embodiments, some or all of the elements of process 800 can be executed in a different order, concurrently, and the like. Also some elements of process 800 may not be performed, and may not be executed immediately after each other. In addition, some or all of the elements of process 800 can be performed automatically, that is, without human intervention.

Referring to FIG. 8, at 802, a status may be generated at the headset 202. As used herein the term "status" may include a status change, notification of a status, and the like. At 804, the status change or notification of status may be generated responsive to user operation of the headset 202. For example, the user may operate the user-operable controls 320 of the headset 202. Responsive to the operation of volume controls, the volume may change, and if a maximum or minimum volume is reached, the headset 202 may generate a notification of maximum or minimum volume, which may be announced for the user over the speaker 316 of the headset 202. Responsive to the operation of a microphone mute control, audio generated by the microphone 314 may be blocked from transmission from the headset 202 by the transceiver 312, and the headset 202 may generate a notification of microphone mute on or microphone mute off, which may be announced for the user over the speaker 316 of the headset 202. Responsive to the operation of a call control, the headset 202 may start a call or end a call.

At 806, the status change or notification of status may be generated responsive to an internal event at the headset 202. For example, the processor 308 may determine that the power level of the power supply 326 has dropped below a threshold, and may therefore announce this status change for the user over the speaker 316 of the headset.

At 808, the status may be generated responsive to an inquiry from the smartwatch 204. For example, the smartwatch 204 may send a message over the wireless link 210 that requests the power level of the power supply 326 of the headset 202.

At 810, responsive to generation of the status, the headset 202 may send an indication of the status to the smartwatch 204. That is, the transceiver 312 of the headset 202 may transmit a message over the wireless link 210, where the message represents the indication of the status.

At 812, the smartwatch 204 may receive the indication of the status. That is, the transceiver 412 of the smartwatch 204 may receive the message transmitted by the headset 202 over the wireless link 210.

At 814, responsive to receiving the indication of the status from the headset 202, the smartwatch 204 may indicate the status of the headset 202. That is, the processor 408 of the smartwatch 204 may cause an output device 418 of the smartwatch 204 to generate an output representing the status. For example, the status may include a microphone mute status, a volume level, a power level of the headset, a notification of maximum volume, a notification of minimum volume, a notification of call start, a notification of call end, and the like. For example, a display of the smartwatch 204 may show a message announcing "Call End" or the like. As another example, a haptic device may vibrate to indicate the headset 202 has reached maximum volume. FIG. 12 shows a watch display showing an icon that indicates the headset volume is at minimum volume (no sound). FIG. 13 shows a watch display showing an icon that indicates the headset microphone 314 is muted.

Figure 9:
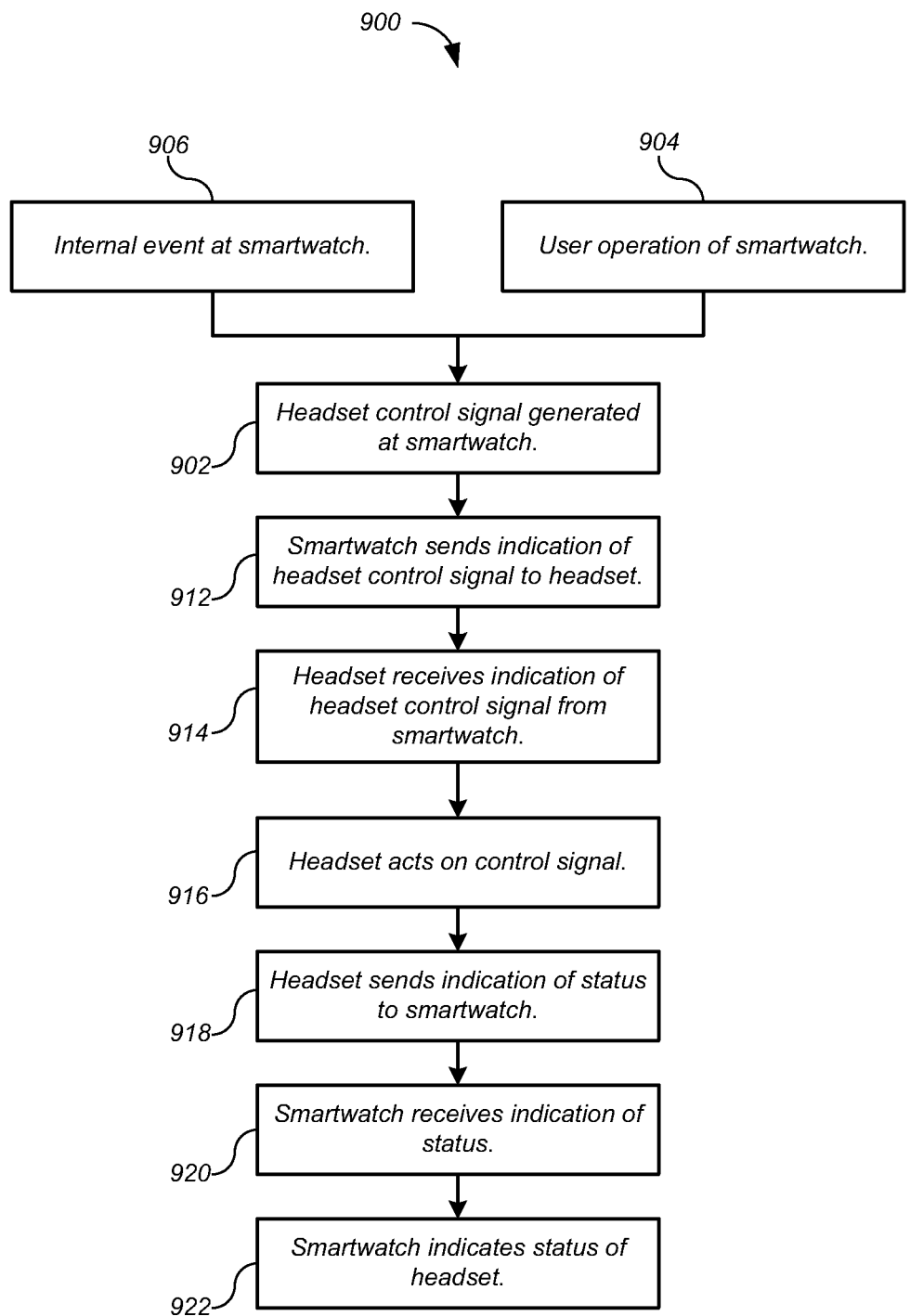
FIG. 9 shows a headset control process for the headset system of FIG. 2 according to one embodiment.

FIG. 9 shows a headset control process 900 for the headset system 200 of FIG. 2 according to one embodiment. Although in the described embodiments the elements of process 900 are presented in one arrangement, other embodiments may feature other arrangements. For example, in various embodiments, some or all of the elements of process 900 can be executed in a different order, concurrently, and the like. Also some elements of process 900 may not be performed, and may not be executed immediately after each other. In addition, some or all of the elements of process 900 can be performed automatically, that is, without human intervention.

Referring to FIG. 9, at 902, a headset control signal may be generated at the smartwatch 204. The headset control signals may include a microphone mute on control signal, a microphone mute off control signal, a volume up control signal, a volume down control signal, a call start control signal, a call answer control signal, a call redial control signal, a call end control signal, and the like.

At 904, the headset control signal may be generated responsive to user operation of the smartwatch 204. For example, the user may operate controls 420 of the smartwatch 204 for volume up, volume down, call start, call answer, call redial, call end, and the like.

At 906, the headset control signal may be generated responsive to an internal event at the smartwatch 204. For example, the processor 408 may determine that a call has been ended by another party to the call.

At 912, responsive to generation of the headset control signal, the smartwatch 204 may send an indication of the headset control signal to the headset 202. That is, the transceiver 412 of the smartwatch 204 may transmit a message over the wireless link 210, where the message represents the headset control signal.

At 914, the headset 202 may receive the indication of the headset control signal. That is, the transceiver 312 of the headset 202 may receive the message transmitted by the smartwatch 204 over the wireless link 210.

At 916, responsive to receiving the indication of the headset control signal from the smartwatch 204, the headset 202 may act on the headset control signal. That is, the processor 308 of the headset 202 may perform the action indicated by the headset control signal. For example, the processor 308 may mute or un-mute the microphone 314 of the headset 202, change the volume level of the headset 202, start, answer, or end a call, redial a number, determine and report a power level of the headset 202, or the like.

Acting on the headset control signal may result in a change of status at the headset 102. At 918, responsive to the status change, the headset 102 may send an indication of the new status to the smartwatch 204. That is, the transceiver 312 of the headset 202 may transmit a message over the wireless link 210, where the message represents the indication of the new status.

At 920, the smartwatch 204 may receive the indication of the status. That is, the transceiver 412 of the smartwatch 204 may receive the message transmitted by the headset 202 over the wireless link 210.

At 922, responsive to receiving the indication of the status from the headset 202, the smartphone 106 may indicate the status of the headset 202. That is, the processor 508 of the smartwatch 204 may cause an output device 418 of the smartwatch 204 to generate an output representing the status. For example, the status may include a microphone mute status, a volume level, a power level of the headset 202, a notification of maximum volume, a notification of minimum volume, a notification of call start, a notification of call end, and the like. For example, a display of the smartwatch 204 may show a message announcing "Call End" or the like. As another example, a haptic device of the smartwatch 204 may vibrate to indicate the headset 202 has reached maximum volume. FIG. 12 shows a watch display showing an icon that indicates the headset volume is at minimum volume (no sound). FIG. 13 shows a watch display showing an icon that indicates the headset microphone 314 is muted.

Various embodiments of the present disclosure can be implemented in digital electronic circuitry, or in computer hardware, firmware, software, or in combinations thereof. Embodiments of the present disclosure can be implemented in a computer program product tangibly embodied in a computer-readable storage device for execution by a programmable processor. The described processes can be performed by a programmable processor executing a program of instructions to perform functions by operating on input data and generating output. Embodiments of the present disclosure can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, processors receive instructions and data from a read-only memory and/or a random access memory. Generally, a computer includes one or more mass storage devices for storing data files. Such devices include magnetic disks, such as internal hard disks and removable disks, magneto-optical disks; optical disks, and solid-state disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits). As used herein, the term "module" may refer to any of the above implementations.

A number of implementations have been described. Nevertheless, various modifications may be made without departing from the scope of the disclosure. Accordingly, other implementations are within the scope of the following claims.

What is claimed is:

1. A wearable device comprising:
   a display device;
   a receiver configured to communicate over a wireless link with a phone; and
   a processor configured to cause the display device of the wearable device to indicate a microphone mute status change of a headset resulting from a user operation of a microphone mute control at the headset, the headset being in wireless communication with the phone, responsive to the receiver receiving, over the wireless link, an indication of the microphone mute status change of the headset.

2. The wearable device of claim 1, further comprising:
   a transmitter;
   wherein the processor is configured to cause the transmitter to transmit a control signal over the wireless link responsive to user operation of the wearable device.

3. The wearable device of claim 2, wherein the control signal includes at least one of:
   a microphone mute on control signal;
   a microphone mute off control signal;
   a volume up control signal;
   a volume down control signal;
   a call start control signal;

a call answer control signal;
a call redial control signal; and
a call end control signal.

4. The wearable device of claim 1, wherein the wearable device includes at least one of:
a wristwatch;
a wristband;
a ring;
a necklace; and
a garment.

5. The wearable device of claim 1, wherein the phone includes at least one of:
a smartphone;
a feature phone;
a soft phone; and
a desk phone.

6. One or more non-transitory computer-readable storage media having computer-executable instructions stored thereon which, when executed by one or more computers, cause the one more computers to perform operations comprising:
receiving at a wearable device, from a phone, over a wireless link with the phone, an indication of a microphone mute status change of a headset responsive to a user operation of a microphone mute control at the headset; and
causing a display device of the wearable device to indicate the microphone mute status change of the headset responsive to receiving the indication of the microphone mute status change of the headset.

7. The one or more non-transitory computer-readable storage media of claim 6, wherein the operations further comprise:
causing a transmitter of the wearable device to transmit a control signal over the wireless link responsive to user operation of the wearable device.

8. The one or more non-transitory computer-readable storage media of claim 7, wherein the control signal includes at least one of:
a microphone mute on control signal;
a microphone mute off control signal;
a volume up control signal;
a volume down control signal;
a call start control signal;
a call answer control signal;
a call redial control signal;
a call end control signal.

9. The one or more non-transitory computer-readable storage media of claim 6, wherein the wearable device includes at least one of:
a wristwatch;
a wristband;
a ring;
a necklace; and
a garment.

10. The one or more non-transitory computer-readable storage media of claim 6, wherein the phone includes at least one of:
a smartphone;
a feature phone;
a soft phone; and
a desk phone.

11. A wearable device comprising:
a display device;
a receiver configured to communicate over a wireless link with a headset; and
a processor configured to cause the display device of the wearable device to indicate a microphone mute status change of the headset resulting from a user operation of a microphone mute control at the headset responsive to the receiver receiving, over the wireless link, an indication of the microphone mute status change of the headset.

12. The wearable device of claim 11, further comprising:
a transmitter;
wherein the processor is configured to cause the transmitter to transmit a control signal over the wireless link responsive to user operation of the wearable device.

13. The wearable device of claim 12, wherein the control signal includes at least one of:
a microphone mute on control signal;
a microphone mute off control signal;
a volume up control signal;
a volume down control signal;
a call start control signal;
a call answer control signal;
a call redial control signal; and
a call end control signal.

14. The wearable device of claim 11, wherein the wearable device includes at least one of:
a wristwatch;
a wristband;
a ring;
a necklace; and
a garment.

15. One or more non-transitory computer-readable storage media having computer-executable instructions stored thereon which, when executed by one or more computers, cause the one more computers to perform operations comprising:
receiving a user operation of a microphone mute control at a headset;
receiving at a wearable device from the headset, over a wireless link with the headset, an indication of a microphone mute status change of the headset resulting from the user operation of the microphone mute control at the headset; and
causing a display device of the wearable device to indicate the microphone mute status change of the headset responsive to receiving the indication of the microphone mute status change of the headset.

16. The one or more non-transitory computer-readable storage media of claim 15, wherein the operations further comprise:
causing a transmitter of the wearable device to transmit a control signal over the wireless link responsive to user operation of the wearable device.

17. The one or more non-transitory computer-readable storage media of claim 16, wherein the control signal includes at least one of:
a microphone mute on control signal;
a microphone mute off control signal;
a volume up control signal;
a volume down control signal;
a call start control signal;
a call answer control signal;
a call redial control signal;
a call end control signal.

18. The one or more non-transitory computer-readable storage media of claim 15, wherein the wearable device includes at least one of:
a wristwatch;
a wristband;

a ring;
a necklace; and
a garment.

\* \* \* \* \*